United States Patent [19]

Brown et al.

[11] Patent Number: 4,591,689

[45] Date of Patent: May 27, 1986

[54] ADAPTIVE WELDING GUIDANCE APPARATUS

[75] Inventors: Ronald D. Brown, Mapleton; James D. Waters, Jr., Montgomery, both of Ill.

[73] Assignee: Caterpillar Tractor Co., Peoria, Ill.

[21] Appl. No.: 705,159

[22] Filed: Feb. 25, 1985

[51] Int. Cl.$^4$ .................................................. B23K 9/12
[52] U.S. Cl. .............................. 219/124.34; 219/137.71
[58] Field of Search ..................... 219/124.34, 124.22, 219/137.71

[56] References Cited

U.S. PATENT DOCUMENTS

| | | | |
|---|---|---|---|
| 3,135,857 | 6/1964 | Von Voros | 219/125 |
| 4,215,299 | 7/1980 | Edwin et al. | 318/574 |
| 4,298,785 | 11/1981 | Krenzer et al. | 219/124.34 |
| 4,477,713 | 10/1984 | Cook et al. | 219/124.34 |
| 4,493,968 | 1/1985 | Brown | 219/124.34 |
| 4,501,950 | 2/1985 | Richardson | 219/124.34 |

FOREIGN PATENT DOCUMENTS

| | | |
|---|---|---|
| 2507310 | 12/1982 | France . |
| WO84/00913 | 3/1984 | PCT Int'l Appl. . |
| WO84/01731 | 5/1984 | PCT Int'l Appl. . |
| 946990 | 1/1964 | United Kingdom . |

Primary Examiner—Clifford C. Shaw
Attorney, Agent, or Firm—Terry D. Morgan

[57] ABSTRACT

An apparatus for guiding a welding torch along a weld groove has a visual sensing system for detecting the weld groove cross sectional configuration and relative position of the edges of weld groove. The positional and cross sectional information is assimilated under microprocessor control to actively guide the welding torch through the control of a series of servo motors and adaptively position the welding electrode at an optimal preselected location with the weld groove.

14 Claims, 12 Drawing Figures

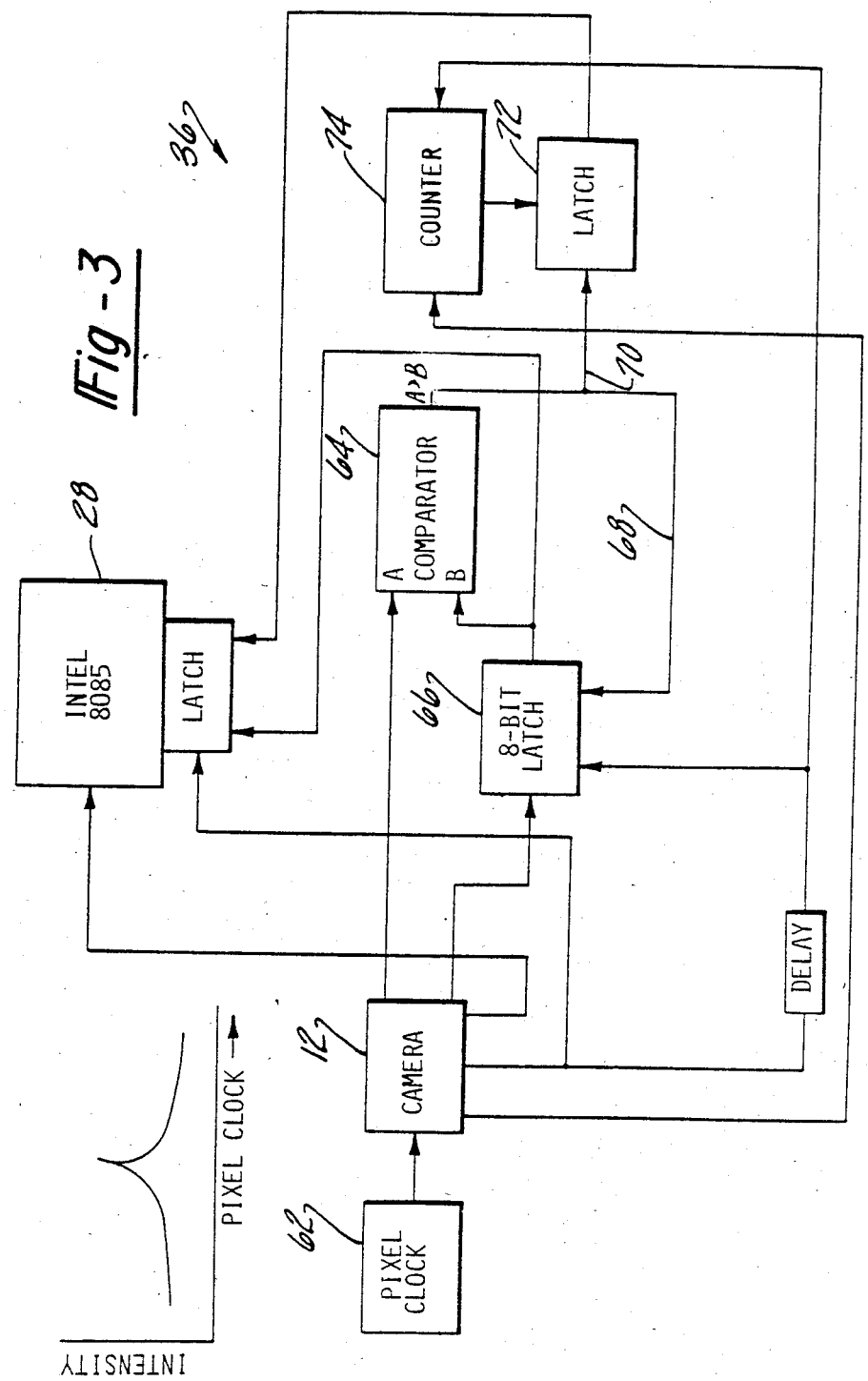

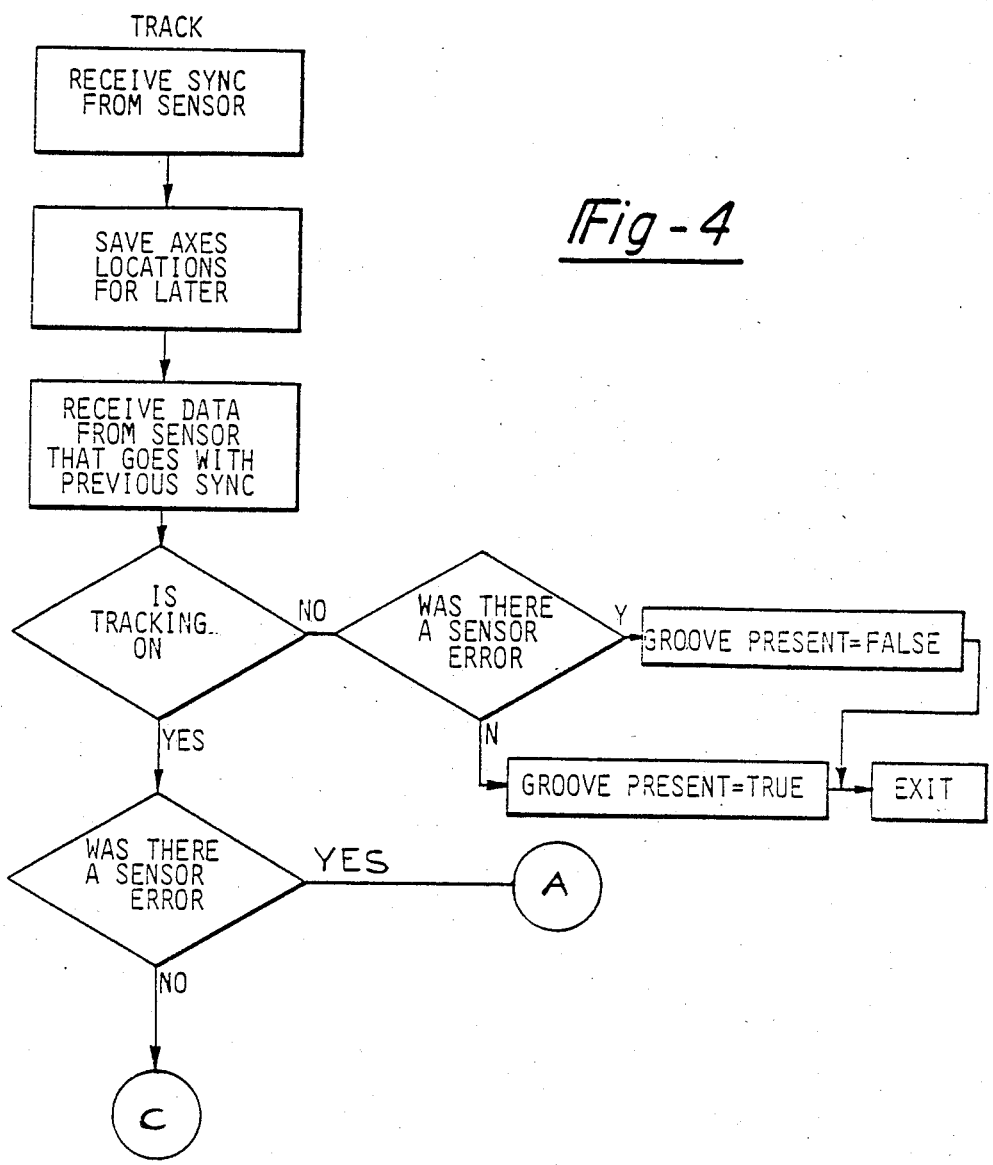

(C)

GUIDANCE POINT = DESIRED EDGE (1) − ((DESIRED EDGE (1) − DESIRED EDGE (2)) × PERCENT BIAS

SENSOR DISTANCE OFFSET = $\sqrt{(\text{GUIDANCE POINT})^2 + (\text{SENSOR DISTANCE})^2}$ GROOVE ANGLE = ARCTAN $\left(\dfrac{-\text{GUIDANCE POINT}}{\text{SENSOR DISTANCE OFFSET}}\right)$ GUIDANCE POINT (X) = MACHINE LOCATION (X) + (SENSOR DISTANCE OFFSET (COS (GROOVE ANGLE + SENSOR ANGLE)))

GUIDANCE POINT (Y) = MACHINE LOCATION (Y) + (SENSOR DISTANCE OFFSET (COS (GROOVE ANGLE + SENSOR ANGLE)))

DISTANCE FROM LAST POINT > .2" — NO → EXIT

YES → (B)

*Fig-4A*

ADAPTIVE WELDING GUIDANCE APPARATUS

TECHNICAL FIELD

This invention relates generally to an adaptive welding apparatus for guiding a welding head along a weld groove and, more particularly, for guiding the welding head to a predetermined location within the weld groove in response to the weld groove cross sectional configuration.

BACKGROUND ART

In the field of adaptive welding, many attempts have been made to automate the welding process, as evidenced by the tremendous body of art principally directed to locating and tracking weld grooves. The art ranges from simple tactile sensors, which provide a good deal of information on the location of the groove, but little about the groove's dimensions or shape, to the more advanced vision type systems, mimicking the human operators method of guiding the welding torch along the groove. In fact, the human operator appears to be the model, or at least the standard to which all machine welds are compared. Adaptive welders have shown an ability to weld many times faster, for longer periods of time, and with a consistency considered unachievable by their human counterparts. Given that the adaptive welders perform the functions of the human welder with a higher degree of accuracy and consistency, one may reasonably assume that adaptive machine welding is consistently of a higher quality than those welds performed by human operators. However, no connection has been suggested between the quality of a weld and the guidance point of the welding head within the weld groove. For example, guiding to the center of a symmetrical weld groove may provide a weld of superior quality, but implementing the same guidance scheme on a weld groove having a nonsymmetrical cross sectional configuration could result in a weld having less than ideal physical characteristics. Similarly, guiding the welding head at a constant distance from one of the groove edges may prove less than satisfactory in areas of groove width variation, where in the worst case, welding could actually be performed outside the groove. At best, welding will occur at the optimum position within the groove purely by chance and only momentarily.

The present invention is directed to overcoming one or more of the problems as set forth above by positioning the welding head at the optimum welding position and adaptively maintaining this optimum positioning during the welding process.

DISCLOSURE OF THE INVENTION

In accordance with one aspect of the present invention, an adaptive welding apparatus for guiding a welding torch along a weld groove has a first means for moving a sensing element along a pathway extending across the weld groove. The sensing element detects the weld groove cross sectional configuration, and delivers signals in response to the position and configuration of the weld groove cross section. A second means receives the signals, determines relative locations of preselected points on the weld groove, and computes a center of area of the weld groove cross section. Further, a third means computes a guidance point in response to the center of area and controls the lateral movement of the welding head in a direction toward the guidance point.

Previous adaptive welding appartus have been primarily concerned with locating a welding groove and guiding a welding head along the groove with little or no consideration to the position of the welding head within the groove and its effect on weld quality. The present invention is directed to an apparatus for guiding the weld head along the optimum weld path based on the cross sectional configuration of the weld groove.

BRIEF DESCRIPTION OF THE DRAWINGS

FIG. 3 is a detailed block diagram of an interface between the optical system and a data processor embodiment of FIG. 1;

FIGS. 4, 4a, and 4b are flowcharts of part of the software used in the preferred implementation of the invention;

BEST MODE FOR CARRYING OUT THE INVENTION

Figure 1:
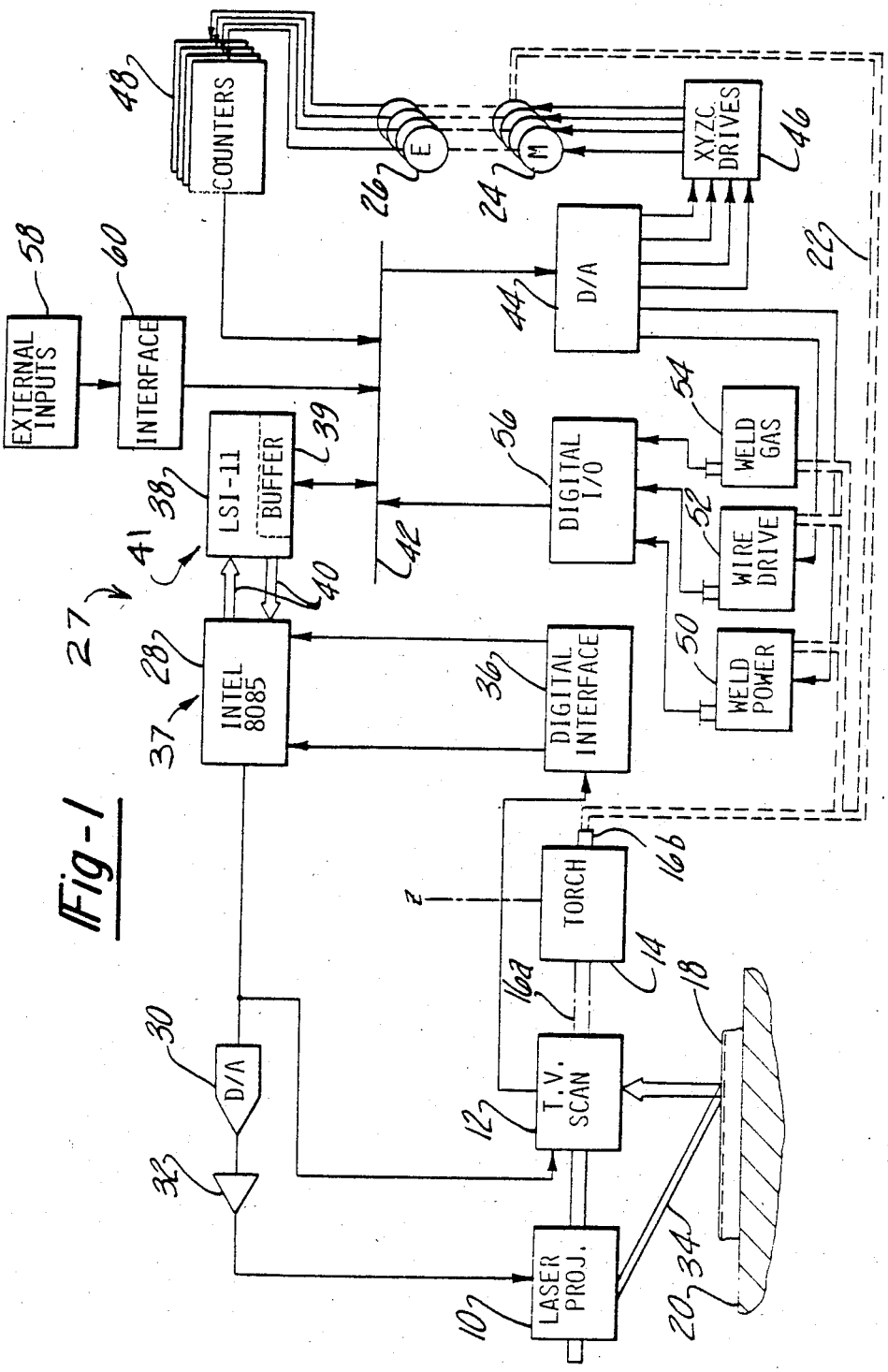
FIG. 1 is a block diagram of an adaptive welding system embodying the invention.

An adaptive welding apparatus 8 for guiding a welding torch 14 along a welding groove is shown in FIG. 1. A laser projector 10 and a raster-scanning type TV camera 12, such as General Electric TN 2500, make up the basic optical system and are mounted along with the MIG-type wire welding torch 14 on a movable platform 16a, 16b for controlled motion relative to a workpiece 18 which lies on a fixed support 20. The support 20 lies within a three-axis (Cartesian) coordinate system of which the Z or vertical axis extends along the centerline of the torch 14. The break between platform portions 16a and 16b indicates a fourth degree of freedom so that the projector 10 and scanner 12 can rotate or "swing" about the Z-axis and the optical system can follow a weld groove without disturbing the X,Y coordinates of the torch.

The platform 16 is mechanically connected, as represented at 22, to axis drive motors 24 which move the platform 16 in the desired direction, to the desired degree and at the desired rate in following weld in the workpiece 18. Encoders 26 monitor the extent and direction of rotation of the motors 24 in the conventional servo-positioning fashion and keep track of the relationship between commanded positions and actual positions of the platform 16 along the X,Y,Z axes and about the Z axis.

A first means 27 moves a sensing element 29 along a preselected pathway which extends across the weld groove, senses the weld groove cross sectional configuration, and delivers signals in response to the position and configuration of the weld groove cross section. The first means 27 can include, for example, an Intel 8085 digital computer 28 connected through a digital-to-analog converter 30 and amplifier 32 to a galvanometer-type mirror drive means in the projector 10 which causes a beam 34 of monochromatic light to be projected at an angle onto the workpiece 18 forming a spot of laser light which moves linearly across the weld groove at a controlled rate, as hereinafter described in more detail with reference to FIGS. 2 and 3. The reflection of the beam 34 from the surface of the workpiece 18 is received by the TV-camera scanner 12, also described in more detail with reference to FIGS. 2 and 3, and produces a digital data stream which is operated on by the interface 36 which provides data to the Intel 8085 computer 28 representing the peak intensity locations of the laser beam reflection at controlled time intervals. Those skilled in the art of noncontacting sensor design will recognize that other types of sensing elements 29 such as inductive, capacitive, or other optical designs can be used without departing from the spirit of the invention.

A second means 37 receives the signals representing peak intensity locations, determines relative locations of preselected points on said weld groove, and computes a relative location of the center of area of the weld groove cross section. The center of area is computed by performing an integration on the area of the groove. Only the lateral position of the center of area is computed. The second means 37 can include, for example, a portion of the software used by the Intel computer 28 which generates a set of ten signals and provides these signals to a third means 41 via an RS-232C data link 40. The ten signals are:

(1) position of center of groove area along the laser scan;
(2) position of left edge of the groove;
(3) position of right edge of the groove;
(4) height of left edge;
(5) height of right edge;
(6) depth of groove;
(7) area of groove;
(8) check sum;
(9) end of message; and
(10) sync signal The third means 41 computes the X and Y coordinates of a guidance point as a function of the center of groove area (described in greater detail in conjunction with the flowcharts of FIG. 4) and delivers the necessary outputs to the axis drives 46 and controls the lateral movement of the welding torch 14 in a direction toward the guidance point. More particularly, the computer 38 is connected via a bus 42 to the D/A converter 44 and provides signals to the X,Y,Z, and C (swing) axis drives 46 which operate the motors 24 and guide the torch 14 within the weld groove along a particular path related to the center of the groove's cross sectional area and/or the left and right groove edges. The scanner 12 looks ahead of the torch 14 by a preselected distance, for example, in the embodiment shown, the scanner 12 precedes the torch 14 by a distance segment of about 4 inches; consequently, a store of about 20 position commands, each representing a portion of the 4 inch segment (e.g. approximately 0.2 inches), is placed in a ring-buffer 39 in the computer 38 and output to the axis drives 46 on a FIFO basis which moves the platform 16 at the desired rate and in the appropriate direction. In addition to controlling the lateral positioning of the weld torch 14, the average of the Z coordinates of the left and right weld groove edges provides a vertical guidance point toward which the torch 14 is directed by the computer 38. Counters 48 maintain a current count of position-increment pulses from the encoders 26 which represent the current position of the torch 14 and platform 16 within the coordinate system. This data is fed back to the computer 38 via the bus 42 and compared to position commands and generate error signals in conventional servo fashion.

The computer 38 also provides weld-fill control signals via a converter 44 to a weld power controller 50 and a wire drive unit 52 which varies the welding parameters according to a desired end result, e.g., to achieve a certain pre-established fill percentage. The controller 50, wire drive unit 52 and a welding gas control solenoid 54 all have on-off controls, such as pushbuttons, which are connected via an I/O unit 56 to the bus 42 and advise the computer 38 that these units are or are not in condition for control by the computer 38. Although shown in the drawing as being on the units themselves, the on-off pushbuttons are preferably mounted on a remote control panel.

Conventional external inputs such as jog, tape drive, and keyboard inputs may be entered via a unit 58 and an interface 60 associated therewith.

The simultaneous, coordinated control of the tracking and weld-fill functions is an important feature of the system as it provides not only variability in the selection of weld characteristics, but also compensates for relatively wide variations in the groove itself. For example, parts are commonly held together prior to final welding by manually placing a number of tack welds along the groove. The present system senses the material build-up of these tack welds as variations in weld area and varies the deposition rate in the area of each tack and prevents overfilling. Moreover, the vertical guidance point is unaffected by changes in the area or depth of the weld groove and maintains the torch 14 at the average height of the left and right groove edges. This action provides the added benefit of "burning through" or melting the previous tack welds and provides better welding characteristics without over-filling the existing groove. Systems which maintain the welding torch 14 at a constant height above the bottom of the groove will raise the torch 14 over tack welds providing less than ideal welds.

Figure 2:
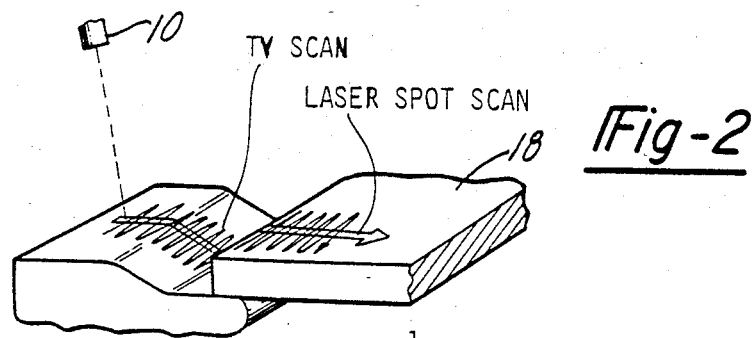
FIG. 2 is a detailed drawing representing the light spot and TV scanning functions of the optical apparatus in the system of FIG. 1.
Figure 2A:
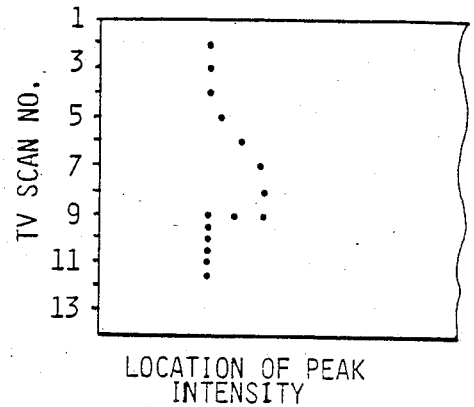
FIG. 2A is a representation of a digital weld groove scan using apparatus of FIG. 1 in the scanning mode suggested by FIG. 2.

Referring now to FIGS. 2 and 2A, the spatial and timing characteristics of the projection and scanning operations provided by the units 10 and 12 are explained. The laser beam is projected onto the workpiece 18 at an angle of about 25-30 degrees from vertical measured in a plane parallel to the groove. The spot is caused to travel a path across the groove, i.e., the beam sweeps through a second plane which intersects the weld groove. Through the aforementioned galvanometric mirror drive means 33, the spot is then returned to the beginning position at a rapid rate and scanned across the groove repetitively. Since the platform 16 is typically moving along the groove, the resulting pattern is a series of parallel stripes across the groove, each being spaced apart in the direction of platform travel.

The TV-scanner camera 12, on the other hand, has a viewing axis which is essentially vertical and a raster scan sensor-strobe function which cuts across the laser spot scan at right angles. Because of the 25-30 degree difference between the projection angle and the viewing angle, the point along any given raster scan at which the TV camera scanner intercepts the laser spot is related to the length of the optical path from the projector 10 to the reflection surface and, hence, to the depth of the groove. This point of interception is determined on the basis of reflected light intensity; i.e., intensity is greatest at the intercept point. The result is a series of digital signals which, taken in their entirety, represent the groove profile over a given laser scan or, if desired, over a series of such scans.

It will, of course, be noted that the scan rate of the TV camera 12 is much higher than that of the projector 10; i.e., the camera scan path cuts across the laser spot path many times during each increment of laser spot movement. In an actual embodiment, the camera 12 exhibits a 248×244 pixel array and three complete scans of the array (each scan being hereinafter termed a "frame") occur for each sweep of the laser spot. However, this ratio of frames per spot sweep may be varied from 1:1 to 4:1 or more which alters the signal-to-noise ratio of the input signal to the camera 12. The variation is readily achieved via the programming of the Intel computer 28.

FIG. 3 illustrates the digital interface 36 in greater detail. This unit presents a series of signals to the Intel computer 28 from which the coordinates of the workpiece surface can be derived at spaced points along the laser spot scan path. From this information, the computer 28 determines the value of the first seven of the output quantities by mathematical calculation.

More specifically, the interface unit 36 provides a digital number (8-bits) representing the pixel clock count at which the camera raster scan intercepts the laser spot during each of the passes of the scan path represented in FIG. 2. By eliminating all pixel counts except the count which represents an interception and, therefor, an actual groove depth, the interface reduces the data processing function of the computer 28 to a significant degree.

The pixel clock 62 effectively strobes the pixels of the sensor array in the camera 12 and scans across the laser path. Each pixel output is effectively a measure of the intensity of the reflected laser light received by that pixel and is applied to one input of a comparator 64 and to an 8-bit latch 66. As long as each new pixel signal (A) is greater than the previous signal (B), the output on line 68 enables the latch 66 which receives and stores the new signal for reference on the next count. The output on line 68 also advances, via line 70, the count stored in the latch 72 from the counter 74. Recognizing that the laser spot reflection spreads appreciably, the pixel outputs continually increases in intensity as long as the camera scan is approaching the center of the reflection. After the center is passed, the intensity of the signals begin to fall off and the condition A/B is not satisfied and the count in latch 72 is not advanced. The stored count remains, therefor, at a number representing the Z coordinate of the work surface at which the intercept occurred. At the end of each camera scan line, an "EOL" signal strobes the count from the latch 72 into the computer 28 as a peak position count and, after a short delay, resets the counter 74 and clears the latch 66. An end-of-frame (EOF) signal from the camera 12 is input to the computer 28 and establishes the portion of the laser spot path which has been examined and digitized (in the preferred embodiment, one-third).

Software involves two major divisions; VIZ, the camera data analysis routine carried out by the Intel 8085, and the track and fill control function carried out by the LSI-11. In addition, the software-controlled functions of the LSI-11 are subdivided into several subroutines, the most important of which are, for example, TRACK, SWING, and FILCTL (fill control).

The camera micro computer 28 is essentially free running, repeating its software cyclicly with no direction from the LSI-11 computer. Once it has finished analyzing an image and transmitted the resulting data to the control computer 38, it takes another image and repeats the cycle. A carriage return character is sent to the control computer 38 to notify it that a new image is being taken. The character catching routine in the control computer 38 recognizes the carriage return as a sync character and saves the current location of all the axis for later use. Once all of the data from the current image has been received by the character catching routine, it activates the routine "TRACK", a representative embodiment of which is shown in flowchart form in FIG. 4.

If tracking is not enabled, then TRACK simply sets a software flag "true" if a groove is in the field of view of the camera and "false" if not. If tracking is enabled, then the sensor data and the axis locations saved when the image was taken are used to determine the location of the weld groove.

Figure 6A:
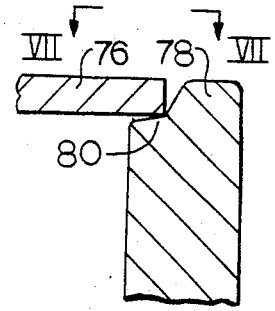
FIGS. 6 and 6a are cross sectional views of J type welding grooves.

First, the guidance point is determined in camera units using the equation:

1.1 guidance point = Desired Edge (1) − (percent bias × (Desired Edge (1) − Desired edge (2)) + constant The Desired Edge variables are selected by the programmer prior to the welding process to be any of the three values left groove edge, right groove edge, or center of area. Selection of the variables is determined by the type, size, and cross section of the groove, whether or not backing is present, how thick the backing is, and many other variables recognized by welding experts as having an effect on the quality of the weld. For example, the weld groove cross section shown in FIG. 6a has a relatively thin plate section 76 with a heavy roll section 78. This type of weld groove will receive the highest quality weld if the welding torch is guided to the center of area. One choice of desired edge variables for equation 1.1 for welding the groove of FIG. 6a is, for example, desired edge (1)=center of area and desired edge (2)=center of area. Choosing both variables to be the same simply cancels the second term from the equation and after selecting constant=0 equation 1.1 becomes:

1.2 guidance point=center of area.

Similar results can be achieved by selecting the percent bias to be zero. It is important to note that in asymmetrical grooves, such as the one illustrated in FIG. 6a, the center of area does not correspond to the center of the groove; therefor, prior art systems which guide to the center of an asymmetrical weld groove will produce a lower quality weld.

Figure 6B:
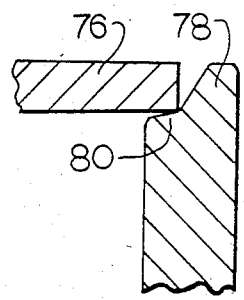

The cross sectional view of the weld groove shown in FIG. 6b differs from the groove of FIG. 6a in that the plate section 76 is heavier and the roll section 78 is lighter. The proper guidance point for this cross section is closer to the plate 76 and is implemented by selecting desired edge (1)=center of area, desired edge (2)=left groove edge and constant=0. The percent bias adjusts the positioning of the weld torch between the center of area and the left edge and is most effectively selected empirically during an experimental phase where various bias values are selected and tested. Substituting these variables into equation 1.1 yields:

1.3 guidance point=center of area −percent bias
(center of area −left groove edge).

Both equations 1.2 and 1.3 will compensate for the common occurrence of poor fit up, where the distance between the plate 76 and roll 78 is large and creates gaps between the plate 76 and backing 80. During this condition, it is necessary to guide the welding torch further from the left groove edge to prevent the welding arc from burning through the gaps and draining the molten metal through the perforation. Both equations guide relative to the center of area, and since the center of area shifts away from the plate 76 as the groove becomes wider, both equations will shift the guidance point in the proper direction away from the plate 76. Those skilled in the art of weld engineering will recognize that there are a large variety of weld groove cross sections, each having a particular guidance point which yields the highest quality weld; consequently, a truly adaptive welder should be capable of welding to any series of points within a welding groove and such a system would be a significant advance in the field.

A second guidance equation identical to equation 1.1 is used by the "TRACK" routine to control the vertical position of the weld torch. The desired edge variables are similarly selected by the programmer prior to the welding process to be either the left or right groove edge vertical coordinate. Variations in the type and size of weld grooves influence the programmer's decision on which of the edges are used as the variables in the guidance equation. Normally, the vertical guidance point is the left edge plus a percentage of the distance between the left and right edge. However, conditions exist where the height of one edge should be neglected. For example, where the height of the right edge is significantly greater than the height of the left edge, only the left edge plus a constant value are used to guide the torch. This function is accomplished by choosing both Desired Edge (1) and Desired Edge (2) to be equal to the left edge height so that the second term is canceled.

Figure 4B:
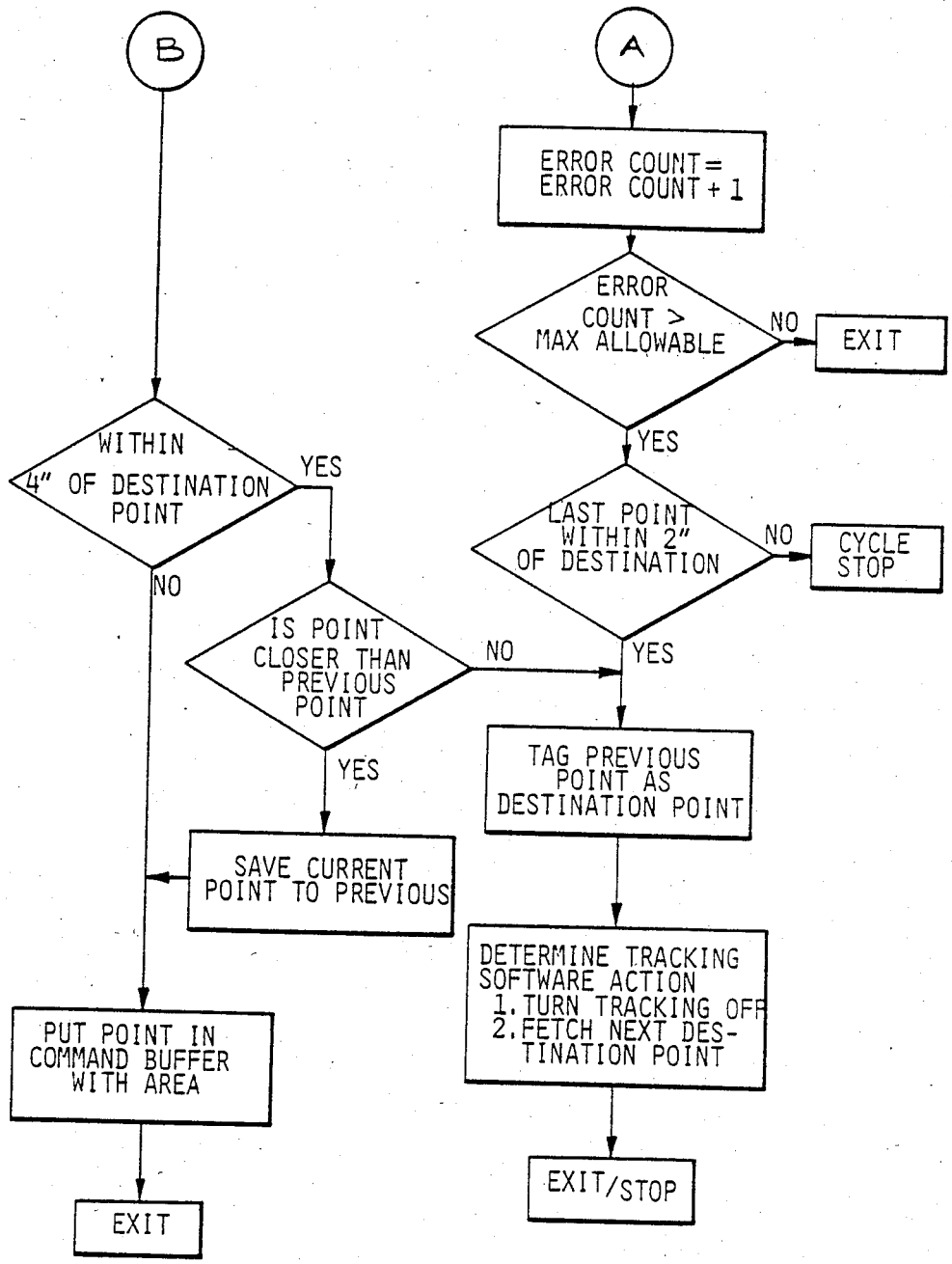
Figure 7:
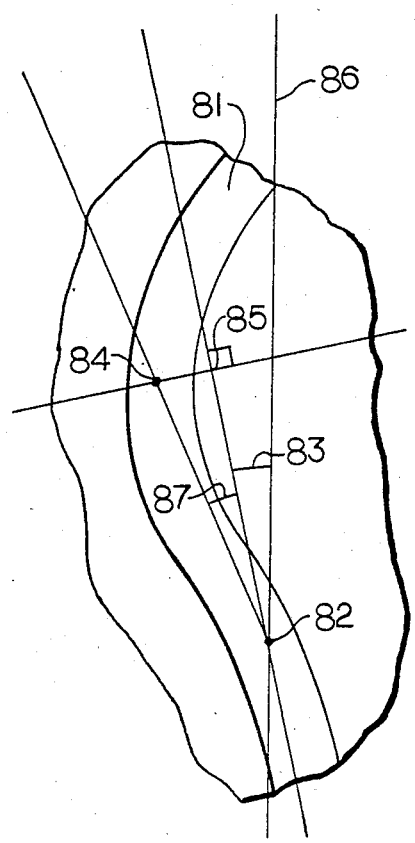
FIG. 7 is a stylized top view of a welding groove and the angular relationship between the welding torch, optical system, and weld groove.

Referring, once again, to the flowchart of FIG. 4, the next step in the TRACK program is computing a sensor distance offset. This offset can best be explained in conjunction with the diagram of FIG. 7. FIG. 7 illustrates a curvilinear welding groove 81 being welded at machine location 82 while simultaneously sensing the weld groove 81 in advance of the weld by scanning laser light across the groove 81 and viewing the reflected light. The optical system is rotated through an angle 83 to maintain the groove 81 within the laser scan path; however, owing to the curvilinear path of the welding groove 81, the previously determined guidance point 84 will not necessarily correspond to the center point 85 of the laser scan path. Consequently, the sensor angle 83 of the optical system does not correspond to the actual angular displacement of the guidance point 84 from a reference plane 86. Further, since the sensor distance corresponds to a known preselected distance between the machine location 82 and the center point 85 of the laser scan path, the guidance point 84 is the distance from a reference point (center point 85) to the guidance point 84, and the corresponding line segments form a right angle, then the sensor distance offset is computed as the square root of the sum of the squares of the two distances. The sensor distance offset is the distance between the machine location 82 and the guidance point 84.

A groove angle 87 is computed by taking the inverse tangent of the guidance point 84 divided by the previously computed sensor distance offset. After knowing the sensor and groove angles 83, 87 and the sensor distance offset, the x and y coordinates of the guidance point are computed. A previously computed guidance point's x and y coordinates, which are the current machine location coordinates, are respectively added to the product of the sensor distance and the cosine of the sum of the groove and the sensor angles, and the product of the sensor distance and the sine of the sum of the groove and sensor angles. These x and y coordinates are stored in the ring-buffer 39 and used as guidance points as needed.

The distance from this guidance point to the previously used guidance point is then checked and if that distance is less than some arbitrary minimum, the current point is discarded and the track routine is suspended. If the distance is greater than the minimum allowable value, a test is made to determine if the previously used point is the closest possible point to the current program point. If so, that point is tagged as being the program point and the interpreter for the sensor is called. For the typical case, the next instruction would be to interpret the weld stop program. The first instruction in that program is currently the "tracking off" instruction which causes the whole tracking process to cease.

If, however, the previous point was not the closest to the program point, then the current point is placed in the first in, first out buffer (FIFO). The area of the groove at this point is also placed in the FIFO for use by the fill control routine when the weld torch nears the associated X, Y, Z point.

The "SWING" routine is also called and maintains the sensor approximately centered over the groove ahead of the torch. The swing routine computes the equation of a line which approximates the path of the upcoming groove from some of the most recent points placed into the FIFO. The intersections of a circle whose radius is the distance between the torch and the point where the laser beam strikes the workpiece are calculated. The center of circle is placed at the point toward which the torch is currently traveling. The proper intersection is chosen and the correct sensor head angle is calculated to place the sensor over that intersection. This angle is made part of the current servo command so that as the torch reaches the current command point, the sensor also reaches the desired angle.

The above processes continue until they are stopped by a "tracking off" instruction in the program, a stop button command signal, or the completion of a predetermined number of continuous sensor errors.

The points are removed from the FIFO as needed and command the computer servo software to move the machine axis. If the system is welding and the fill control is on, the area is also removed from the FIFO and used by the subroutine called "FILCTL". FILCTL uses the groove area to predetermine the described weld metal deposition rate in pounds per hour. The larger the groove area, the greater the deposition rate, within limits. From the deposition rate and the known physical data of the wire, the desired wire-feed speed is calculated. Once the wire feed is determined, the desired groove fill percentage is achieved by calculating the travel speed. Given the calculated travel speed and wire-feed speed, the arc voltage is calculated and adjusted via the controller 50.

Figure 5:
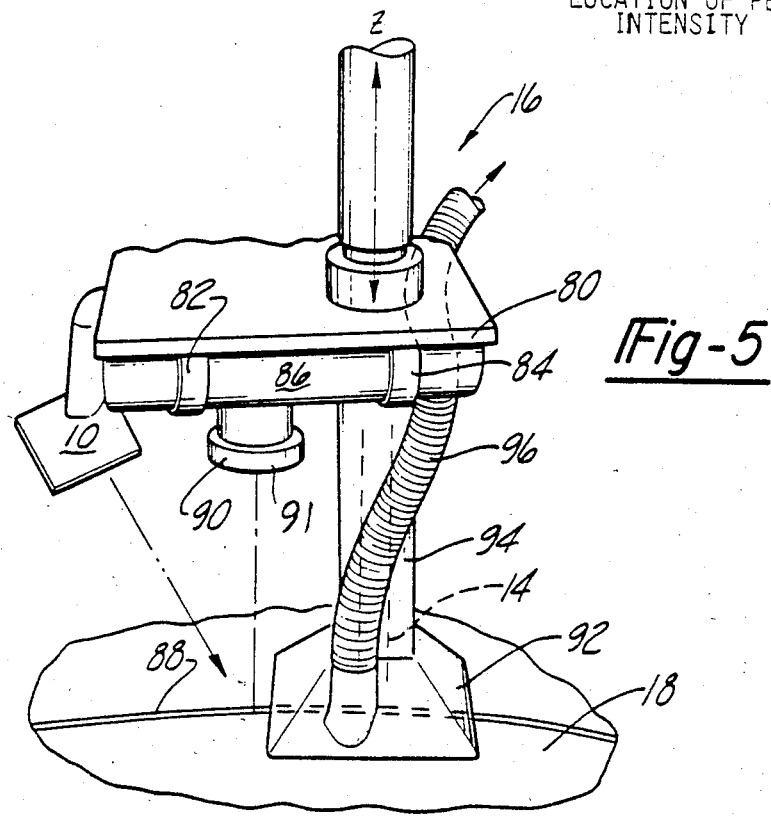
FIG. 5 is a side view of a carriage apparatus for certain optical and mechanical components of the FIG. 1 embodiment.

FIG. 5 is a view of a preferred, actual embodiment of the system of FIGS. 1 and 3 of a single torch MG welder. The platform 16 comprises a servo-positionable structure depending from a cross beam and is movable vertically relative to the workpiece 18 along the Z-axis. A plate 80 has depending arms 82 and 84 and carries a conventional low-power helium-neon laser 86 which projects its output beam laterally via mirrors to the scan-projector 10 containing the galvo-driven mirror which aims the beam downwardly toward the groove 88 in the workpiece 18.

A camera lens 90 of the camera 12 is stationed about 10 inches above the work 18 and focuses on a spot about four inches ahead of the torch 14. A filter 91 mounted on the lens end of the camera 12 passes light only at 632.8 nanometers; i.e., the wavelength of the laser output, and filters out glare from the welding torch 15 which leaks out from under a shield 92 carried at the bottom of the plate 94. A vacuum system comprising one or more hoses 96 removes smoke from the weld area.

Swing motion about the Z-axis is produced by a motor 110. Since the Z-axis runs through the center of the torch, swing movements do not affect the X, Y, Z coordinates of the torch itself. Such movements, do, however, affect the X, Y coordinates of the scan area and thereby permit the optical system 10, 12 to follow curves in the groove 88 ahead of the weld coordinates.

Figure 8:
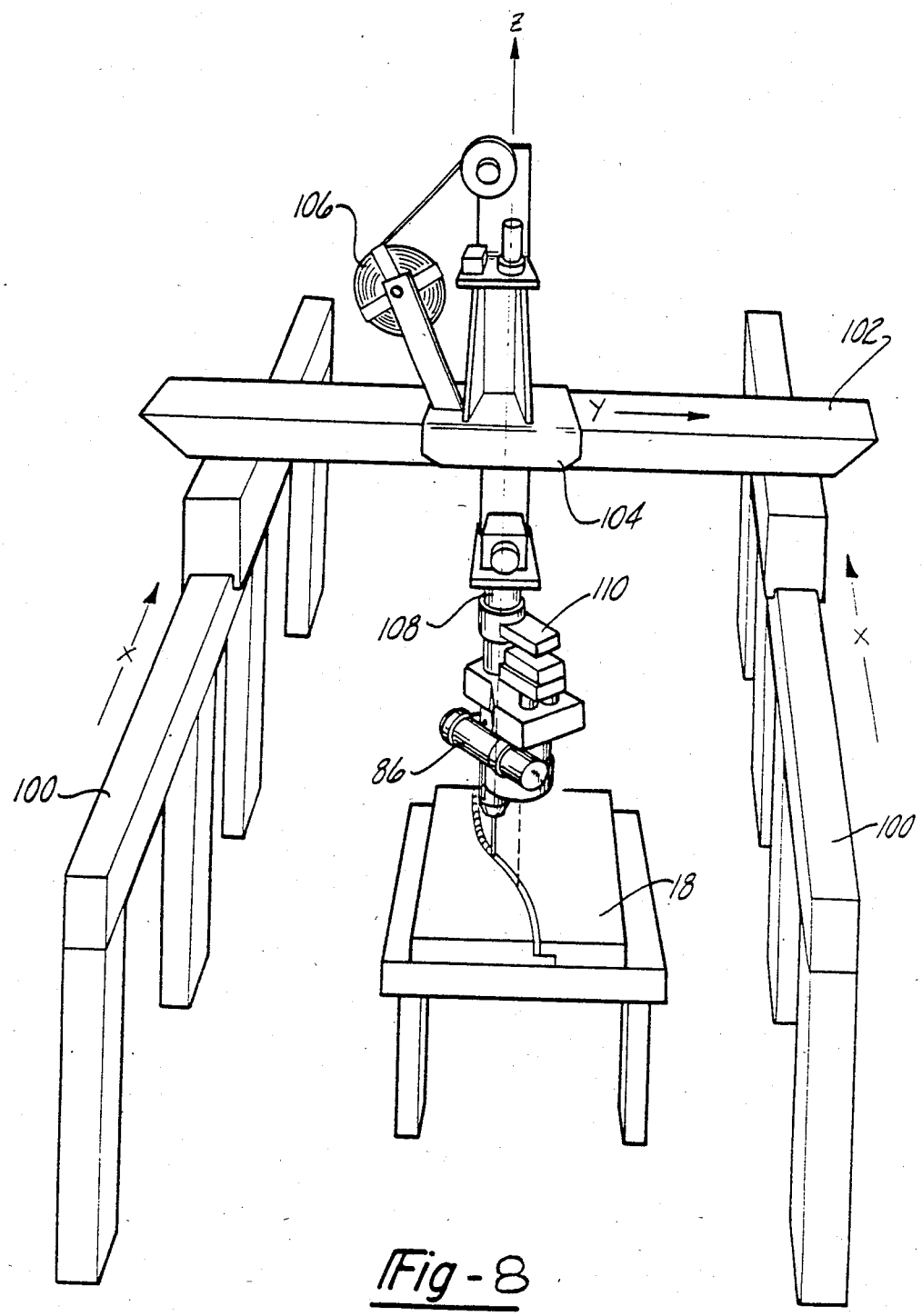
FIG. 8 is a perspective drawing of a three axis welding apparatus.

FIG. 8 shows in greater detail the physical arrangement of the guidance system. X-axis displacement is provided by spaced parallel rails 100 raised above the floor and open-ended to provide entry and exit for the work: A Y-axis support 102 spans the two rails 100 and is mounted thereon by way of wheels to allow displacement. A linear gear-tooth track runs along one of the rails and is engaged by a pinion gear driven by a belt-connected motor and gear-box combination. An encoder above the motor generates pulses representing displacement. The Y-axis carriage 104 is similarly mounted on support 102 and carries the wire reel 106 and wire feed motor. A X-axis drive 108 raises and lowers the platform 16 relative to support 102 and carriage 104 for height control. The swing axis system is described previously.

INDUSTRIAL APPLICABILITY

In the overall operation of a preferred embodiment of the adaptive welding apparatus 8, assume that a computer programmer has previously selected the variables:
(1) Desired Edge (1)
(2) Desired Edge (2)
(3) Percent Bias
(4) Constant
to guide the welding torch 14 along the optimum path within the welding groove. Further, the "TRACK" program is enabled, good data points are being received from the Intel computer 28, and the appropriate signals are being delivered to the axis drives 46 to maintain the welding torch 14 at the desired location within the weld groove. The "SWING" routine is similarly enabled and acting to position the laser light source 86, such that the laser scan path will be approximately centered over the guidance point 84.

The welding torch 14 ultimately reaches a point on the workpiece 18 where the weld groove terminates, or is at least significantly altered in cross sectional configuration. The computer programmer has previously alerted the apparatus 8 to this change in weld groove cross section by programming an approximate location at which the change is to occur. Additionally, if a new guidance point equation is required for the altered cross sectional groove, the programmer inputs these new values and the apparatus 8 continues to weld the new groove with little or no hesitation. Any number of changes can be programmed, depending upon the complexity of the workpiece 18.

Other aspects, objects, advantages, and uses of this apparatus can be obtained from a study of the drawings, the disclosure, and the appended claims.

We claim:

1. An adaptive welding apparatus for guiding a welding torch along a weld groove, comprising:
   first means for moving a sensing element along a preselected pathway extending across said weld groove, sensing the weld groove cross sectional configuration, and delivering signals in response to the position and confituration of the weld groove cross secton;
   second means for receiving said signals, determining relative locations of preselected points on said weld groove, and computing a relative location of the center of area of said weld groove cross section; and
   third means for computing a guidance point as a function of said center of area irrespective of the cross sectional configuration of said weld groove, and controlling the lateral movement of said welding torch in a direction toward said guidance point.

2. The adaptive welding apparatus, as set forth in claim 1, wherein said preselected points include the weld groove edges.

3. The adaptive welding apparatus, as set forth in claim 2, wherein said function includes a first term comprising the lateral coordinates of one of said groove edges and said center of area.

4. The adaptive welding apparatus, as set forth in claim 3, wherein said function includes a second term comprising a preselected percentage deviation of the difference between the lateral coordinates of any two of said groove edges and said center of area.

5. The adaptive welding apparatus, as set forth in claim 4, wherein said function includes a preselected constant.

6. The adaptive welding apparatus, as set forth in claim 1, wherein said second means determines the relative height of the groove edges, said third means computes a vertical guidance point as a function of the height of both of said groove edges, and controls the vertical movement of said welding head in a direction toward said vertical guidance point.

7. The adaptive welding apparatus, as set forth in claim 6, wherein said vertical guidance point function includes a first term comprising the vertical coordinate of one of said groove edges and a second term comprising a preselected percentage deviation of the difference between the vertical coordinates of any two of the groove edges.

8. An adaptive welding apparatus for guiding a welding torch along a weld groove, comprising:

first means for moving a sensing element along a preselected pathway extending across said weld groove, sensing the weld groove cross sectional configuration, and delivering signals in response to the position and configuration of the weld groove cross section;

second means for receiving said signals, determining lateral coordinates of the left and right groove, edges, and computing the center of area of said weld groove cross section; and thrid means for computing an optimum guidance point irrespective of the cross sectional configuration of said weld groove by the equation:

$$\text{Guidance Point} = A - B * (C - D) + X$$

where,

A = one of the left edge, right edge, and center of area

B = percentage deviation

C = one of the left edge, right edge, and center of area

D = one of the left edge, right edge, and center of area

X = constant said variables A,B,C,D, and X being programmable prior to actual welding and alterable at preselected points along said weld groove.

9. A method for guiding a welding torch along a weld groove, comprising:

moving a sensing element along a pathway extending across said weld groove;

sensing the weld groove cross sectional position and configuration;

determining relative locations of preselected points on said weld groove;

computing a relative location of the center of area of said weld groove cross section;

computing a guidance point as a function of said center of area irrespective of the cross sectional configuration of said weld groove; and controlling the lateral motion of said welding head in a direction toward said guidance point.

10. The method, as set forth in claim 9, wherein said preselected points include the weld groove left and right edges.

11. The method, as set forth in claim 10, wherein the step of computing said guidance point includes a first term comprising the lateral coordinates of one of said left and right groove edges and said center of area.

12. The method, as set forth in claim 11, wherein the step of computing said guidance point includes computing a preselected percentage deviation of the difference between the coordinates of any two of said left and right groove edges and said center of area.

13. The method, as set forth in claim 12, wherein the step of computing said guidance point includes adding a preselected constant.

14. An adaptive welding apparatus for guiding a welding torch along a weld groove, comprising:

a laser light source;

means for scanning said laser light along a path extending across said weld groove, defining a first optical axis;

a raster-scan type TV camera positioned on a second optical axis angularly spaced from said first optical axis, said camera being adapted for optically viewing said laser light path and delivering signals in response to the position and configuration of the weld groove cross section;

second means for receiving said signals, determining coordinates of left and right groove edges, and computing the center of area of said weld groove cross section; and third means for computing an optimum guidance point irrespective of the cross sectional configuration of said weld groove by the equation:

$$\text{Guidance Point} = A - B * (C - D) + X$$

where,

A = one of the left edge, right edge and center of area

B = percentage deviation

C = one of the left edge, righe edge, and center of area

D = one of the left edge, right edge, and center of area

X = constant said variables A,B,C,D, and X being programmable to the desired value prior to actual welding and alterable without interruption of the welding process at preselected pionts along said weld groove.

* * * * *

REEXAMINATION CERTIFICATE (1682nd)

United States Patent [19]
Brown et al.

[11] B1 4,591,689
[45] Certificate Issued Apr. 21, 1992

[54] ADAPTIVE WELDING GUIDANCE APPARATUS

[75] Inventors: Ronald D. Brown, Mapleton; James D. Waters, Jr., Montgomery, both of Ill.

[73] Assignee: Caterpillar Inc.

Reexamination Request:
No. 90/001,947, Feb. 26, 1990

Reexamination Certificate for:
Patent No.: 4,591,689
Issued: May 27, 1986
Appl. No.: 705,159
Filed: Feb. 25, 1985

[51] Int. Cl.⁵ .............................. B23K 9/12
[52] U.S. Cl. ..................... 219/124.34; 219/137.71
[58] Field of Search ............. 219/124.34, 137.71, 219/124.22

[56] References Cited
U.S. PATENT DOCUMENTS
4,493,968 1/1985 Brown ..................... 219/124.34
4,501,950 2/1985 Richardson ............. 219/124.34

OTHER PUBLICATIONS

Adaptive Welding Control Using Video Signal Processing—Verdon et al., Paper 29—Proceedings of the International Conference on Developments in Mechanical Automated and Robotic Welding in London 18-19 Nov. 1980, pp. 28-29.

Conference Record of the 1982 Workshop on Industrial Application of Machine Version, Research Triangle Pat. 3-5 May 1982—Tropf, Geisselmann & Forth.

Visually Guided Arc-Welding Robot With Self-training Features—paper presented at the 13th International Symposium on Industrial Robots (I.S.I.R.), Chicago, Apr. 1983, in particular FIG. 3 to pp. T3-13/14.

Industrial Robots International (1983) Sep. 26, p. 5, left col.

Primary Examiner—Clifford C. Shaw

[57] ABSTRACT

An apparatus for guiding a welding torch along a weld groove has a visual sensing system for detecting the weld groove cross sectional configuration and relative position of the edges of weld groove. The positional and cross sectional information is assimilated under microprocessor control to actively guide the welding torch through the control of a series of servo motors and adaptively position the welding electrode at an optimal preselected location with the weld groove.

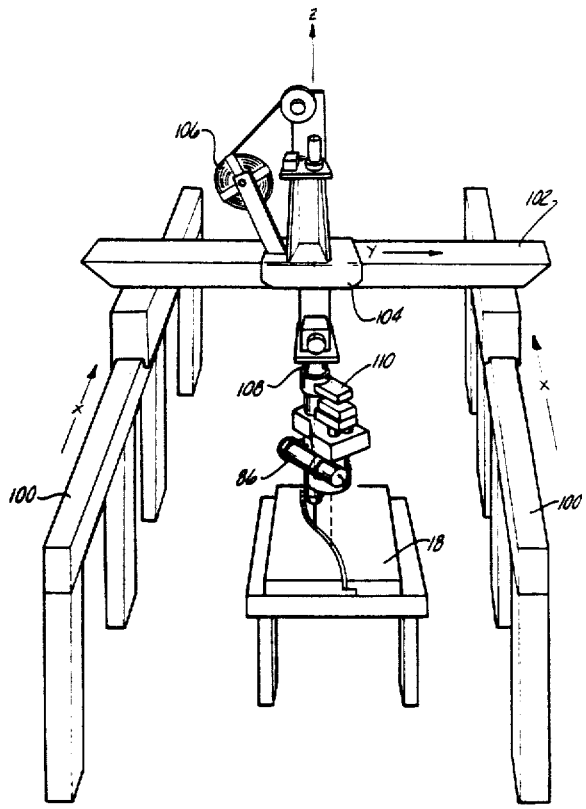

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8 and 14 is confirmed.

Claims 2-4, 11 and 12 are cancelled.

Claims 1, 5, 9, and 13 are determined to be patentable as amended.

Claims 6, 7, and 10, dependent on an amended claim, are determined to be patentable.

1. An adaptive welding apparatus for guiding a welding torch along a weld groove, comprising:
  first means for moving a sensing element along a preselected pathway extending across said weld groove, sensing the weld groove cross sectional configuration, and delivering signals in resonse to the position and [confituration] *configuration* of the weld groove cross [secton] *section;*
  second means for receiving said signals, determining relative locations of preselected points on said weld groove, *said preselected point including the weld groove edges,* and computing a relative location of the center of area of said weld groove cross section; and
  third means for computing a guidance point as a function of said center of area irrespective of the cross sectional configuration of said weld groove, and controlling the lateral movement of said welding torch in a direction towards said guidance point, *said function including a first term comprising the lateral coordinates of one of said weld groove edges and said center of area and a second term comprising a preselected percentage deviation of the difference between the lateral coordinates of any two of said weld groove edges and said center of area.*

5. The adaptive welding apparatus, as set forth in claim [4] *1*, wherein said function includes a preselected constant.

9. A method for guiding a welding torch along a weld groove, comprising:
  moving a sensing element along a pathway extending across said weld groove;
  sensing the weld groove cross sectional position and configuration;
  determining relative locations of preselected points along said weld groove, *said preselected points including the weld groove left and right edges;*
  computing a relative location of the center of area of said weld groove cross sectional area;
  computing a guidance point as a function of said center of area irrespective of the cross sectional configuration of said weld groove, *said function including a first term comprising the lateral coordinates of one of said left and right groove edges and said center of area and a second term which is preselected percentage deviation of the difference between the coordinates of any two of said left and right groove edges and said center of area;* and
  controlling the lateral motion of said welding head in a direction toward said guidance point.

13. The method, as set forth in claim [12] *9*, wherein the step of computing said guidance point includes adding a preselected constant.

* * * * *